United States Patent [19]

Ryan

[11] Patent Number: 4,562,946
[45] Date of Patent: Jan. 7, 1986

[54] TAPE TRANSPORT

[75] Inventor: Dennis M. Ryan, San Mateo, Calif.

[73] Assignee: Ampex Corporation, Redwood City, Calif.

[21] Appl. No.: 418,905

[22] Filed: Sep. 16, 1982

[51] Int. Cl.⁴ .............................................. G01D 5/34
[52] U.S. Cl. .................................. 226/95; 250/231 SE; 250/237 G
[58] Field of Search .......................... 226/95, 188, 194; 318/326; 360/72.8, 74.2, 73, 84; 235/103; 242/102, 204, 201, 203, 68, 205; 250/231 SE, 231 G

[56] References Cited

U.S. PATENT DOCUMENTS

| | | | |
|---|---|---|---|
| 2,838,314 | 6/1958 | Selsted | 226/95 |
| 2,989,642 | 6/1961 | Svec | 250/231 SE |
| 3,005,582 | 10/1961 | Brede | 360/73 |
| 3,802,644 | 4/1974 | Maiershofer | 242/192 |
| 3,803,632 | 4/1974 | Irwin et al. | 360/73 |
| 3,894,232 | 7/1975 | Laspesa | 250/231 SE |
| 3,983,391 | 9/1976 | Clemons | 250/237 G |
| 4,031,441 | 6/1977 | Garrett | 250/231 SE X |
| 4,079,300 | 3/1978 | Sleger | 318/326 |
| 4,132,890 | 1/1979 | Garcia et al. | 250/231 SE |
| 4,152,589 | 5/1979 | Mitchell | 250/231 SE |
| 4,184,071 | 1/1980 | Fryer et al. | 250/231 SE |
| 4,266,125 | 5/1981 | Epstein et al. | 250/231 SE |
| 4,335,306 | 6/1982 | Gort et al. | 250/231 SE |
| 4,338,517 | 7/1982 | Perrine | 250/231 SE |
| 4,342,909 | 8/1982 | Accattino | 250/231 SE |
| 4,343,992 | 8/1982 | Blaser | 250/231 SE |
| 4,345,149 | 8/1982 | Blaser | 250/231 SE |
| 4,375,592 | 3/1983 | Cox et al. | 250/231 SE |

FOREIGN PATENT DOCUMENTS

| | | | |
|---|---|---|---|
| 339807 | 5/1920 | Fed. Rep. of Germany | 242/139 |
| 934433 | 8/1963 | United Kingdom | 226/95 |

Primary Examiner—Stephen Marcus
Assistant Examiner—L. J. Peters
Attorney, Agent, or Firm—Charles M. Carman, Jr.; Harry G. Thibault; Joel D. Talcott

[57] ABSTRACT

A magnetic tape transport has an improved capstan-tachometer construction and reel mounting arrangement.

8 Claims, 6 Drawing Figures

U.S. Patent   Jan. 7, 1986   Sheet 1 of 4   4,562,946
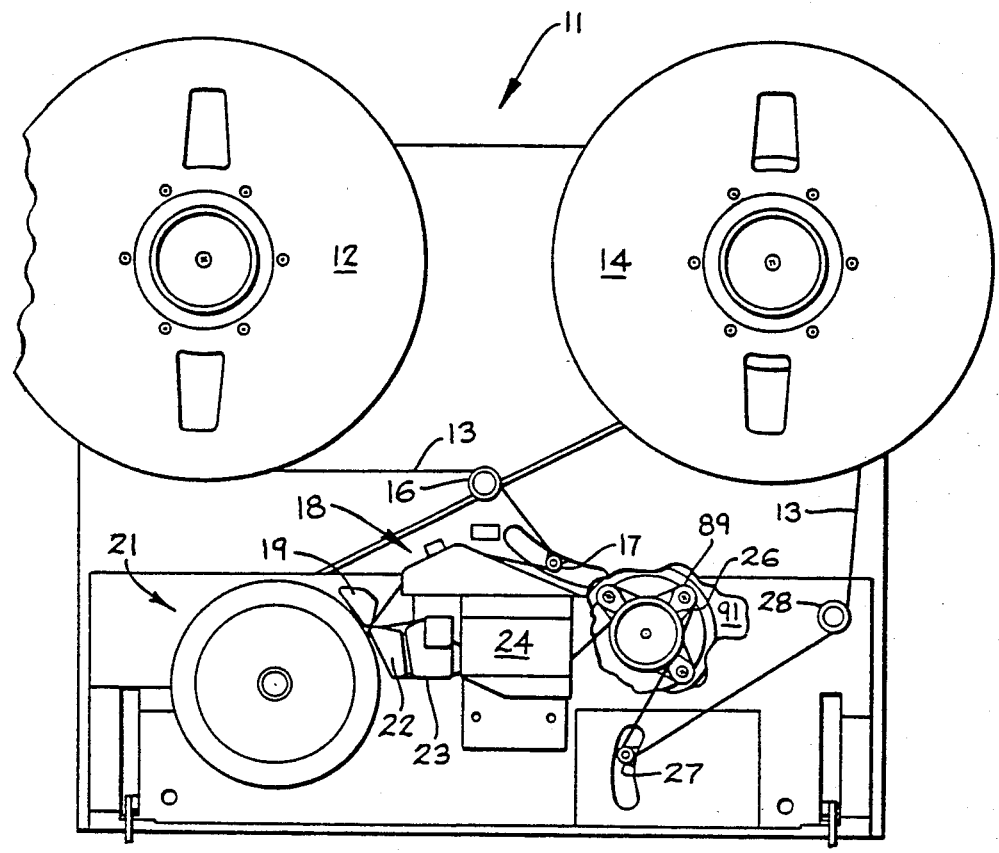
FIG_1
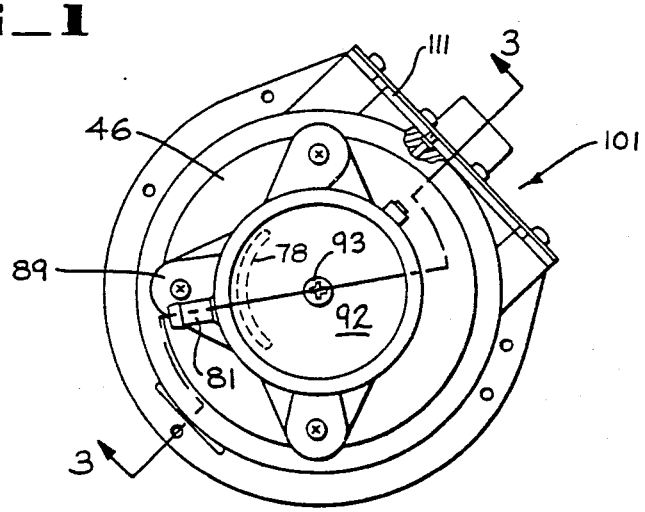
FIG_2

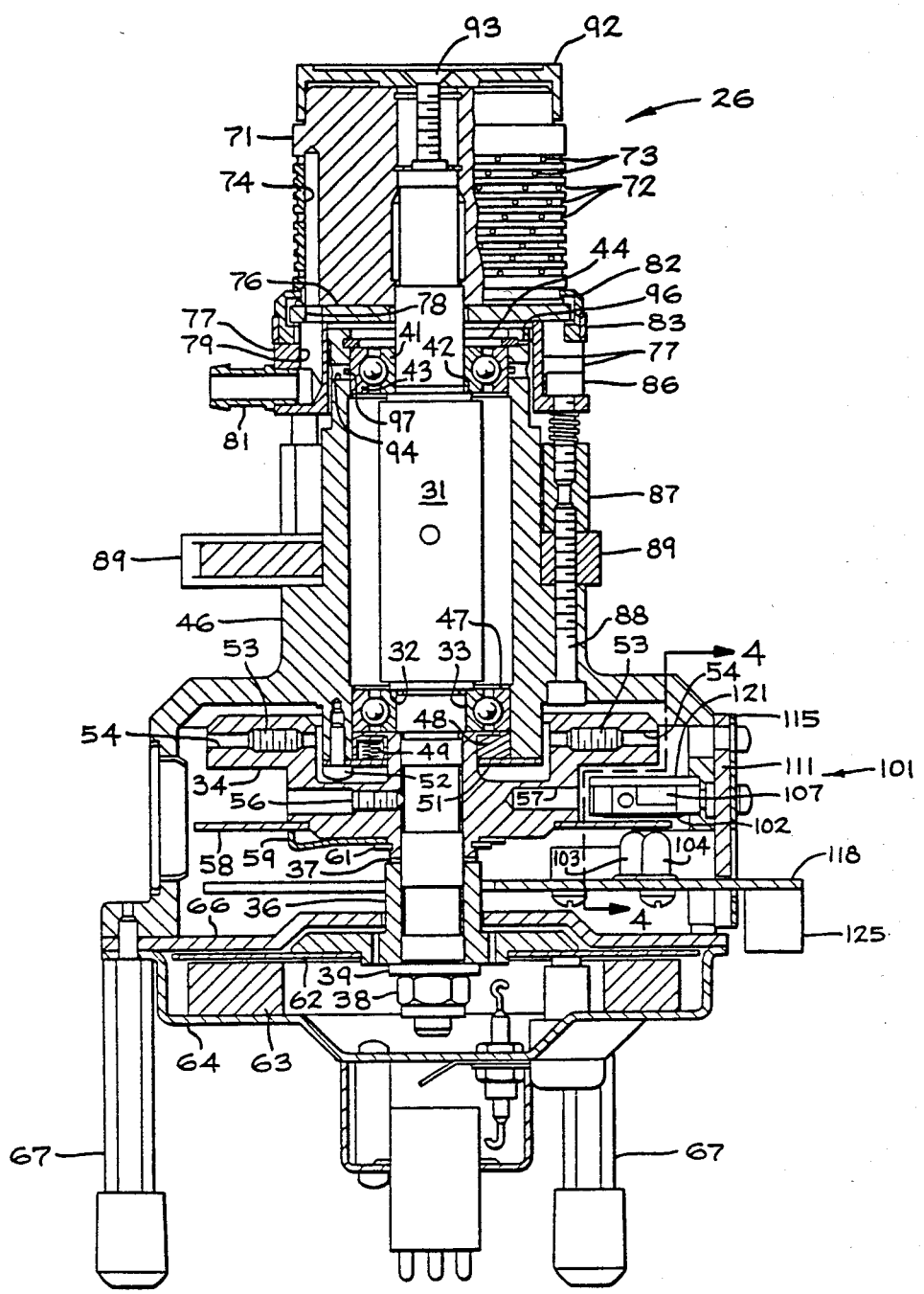
FIG_3

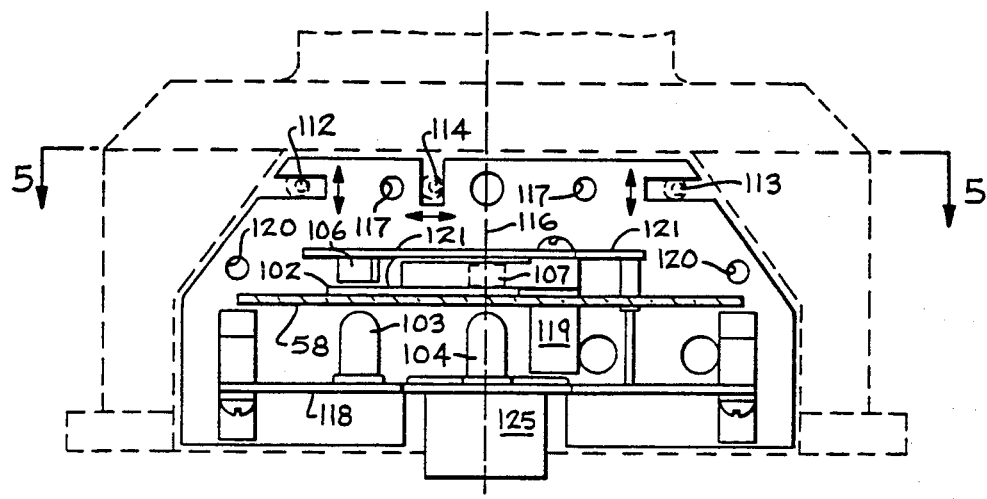
FIG_4
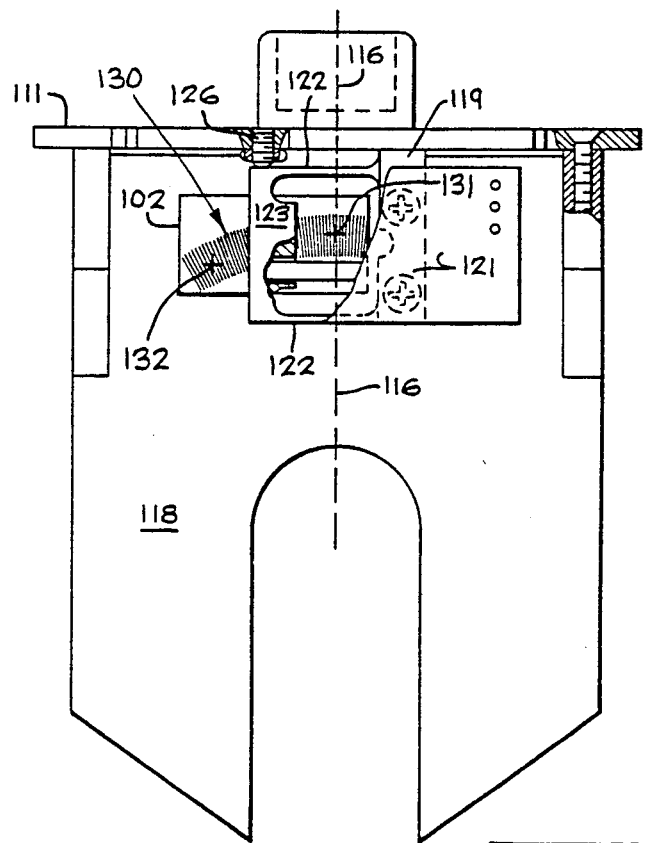
FIG_5

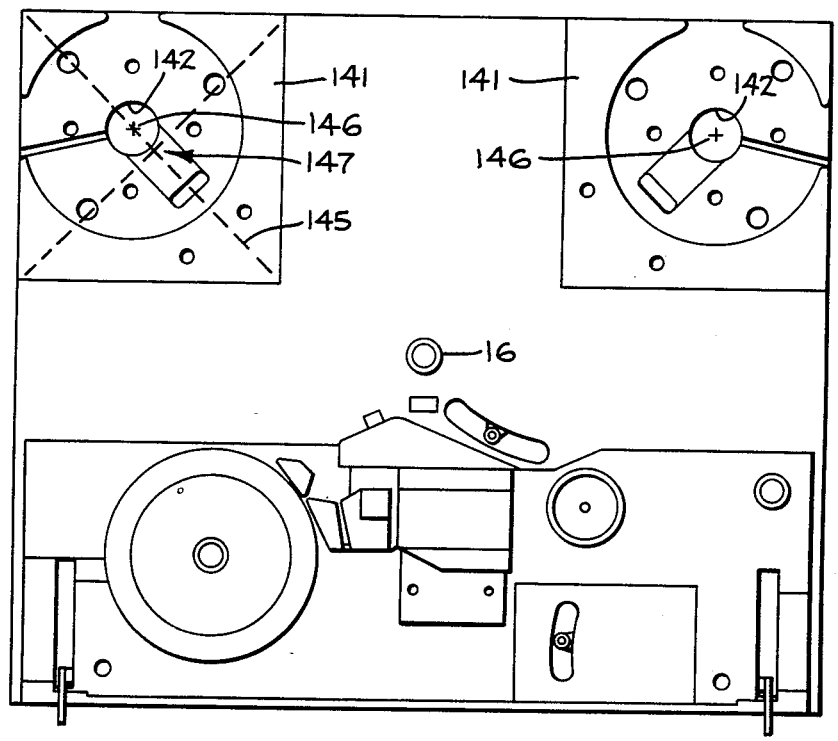
FIG_6

TAPE TRANSPORT

This invention relates to tape transports, and particularly to transports for magnetic recording and reproducing tape.

Tape transports, particularly as known in the magnetic tape recording and reproducing art, usually store the tape on a pair of supply and takeup reels, which may be of many sizes, and which sometimes are so large that they must project beyond the edges of the machine. The tape must be driven between the reels in a metered fashion, at constant speed, for which a capstan and pinch roller combination is often used; but also known are differential air pressure (vacuum or suction) capstans, which obtain frictional driving contact with the tape by means of atmospheric air pressure. To monitor the tape speed, a tachometer is often attached directly to the shaft by which the capstan motor drives the capstan, and a circular array of indicia concentric to the capstan axis is compared with an arcuate array of indicia fixed in place, the comparison being made at two points angularly equispaced from an axial plane containing the centers of both sets of indicia, which are in other axial planes offset. In making this comparison, one problem is resonant torsional vibration in the shaft of the capstan-flywheel-tachometer disc-and-motor-rotor combination.

In a magnetic tape transport, the air pressure differential capstan has a manifold communicating therewith upon a plane orthogonal to the capstan axis to minimize air leakage at less expense; the tachometer disc has a fixed grating eccentric thereto on a predetermined plane of eccentricity, and the disc and grating are compared at one point in this plane and at one point outside this plane for improved accuracy and resolution in measurement of tape speed; the elements mounted on the capstan shaft are clamped axially together rather than keyed to the shaft for improved torsional stiffness; and reversible mounting panels are provided for the reels and their motors.

Accordingly, it is an object of the present invention to provide a tape transport having improved differential air pressure capstan driving characteristics;

It is another object of the present invention to provide a capstan-tachometer assembly having improved accuracy in the measurement of tape speed;

It is a further object of the invention to provide a capstan-tachometer assembly having improved resistance to resonant torsional vibration; and It is a still further object of this invention to provide a transport having improved accomodation of reels of different sizes within a minimal spatial envelope.

DESCRIPTION OF THE DRAWINGS

FIG. 1 is a front elevation view of a portion of a magnetic tape transport including the present invention;

FIG. 2 is an enlarged front elevation view of a portion of the apparatus shown in the broken-away portion of FIG. 1;

FIG. 3 is a cross-sectional view taken on the planes of lines 3—3 of FIG. 2;

FIG. 4 is a further enlarged fragmentary cross-sectional view taken on the plane of lines 4—4 of FIG. 3;

FIG. 5 is an orthogonal view taken on the plane of lines 5—5 of FIG. 4; and

FIG. 6 is a view similar to that of FIG. 1 with the reels removed.

DESCRIPTION OF THE PREFERRED EMBODIMENTS

Referring now to the drawings, and particularly to FIG. 1 thereof, there is shown a tape transport 11 including a supply reel 12, a magnetic tape 13, and a tapeup reel 14, the tape being threaded over a guide 16, a tension arm 17, a stationary video erase head 18, a guide 19, a rotating helical-scanning drum 21, an exit guide 22, flywheel assembly 23, a set of longitudinal recording and transducing heads 24, a capstan-tachometer assembly 26, tension arm 27 and guide 28.

The capstan-tachometer assembly 26 is of the type achieving frictional contact for driving the tape by means of a vacuum-suction or differential air pressure system, rather than by means of a pinch roller; and the tachometer is of the type that is applied directly to the shaft by which the capstan is driven by its motor, so that the tape speed can be the more directly monitored and controlled, all as shown in FIG. 2 and following Figures.

As a novel feature of the apparatus, the rotating parts of the capstan, the tachometer, and the capstan driving motor are all mounted on the same shaft 31 in an arrangement having improved torsional rigidity, particularly to overcome the problem of resonant torsional vibration which often plagues capstan arrangements in the art when the driving element (motor rotor), the load elements (capstan and flywheel) and the rotational speed measuring element (tachometer disc) must of necessity be applied to the shaft at considerably spaced-apart axial points. Clearly, if the shaft is twisting, then the speed computed on the basis of the tachometer measurements will not truly represent the actual speed of the capstan and tape; and the damping effect of the flywheel may be applied at the wrong time (and not applied at the right time); and the correcting effect of changing the motor speed may also be applied inappropriately. Further, if the torsional distortion is a resonant vibratory one then the problem becomes even more difficult to solve.

One factor contributing to the problem in the prior art has been that the rotating elements have been applied to the shaft by means of bolts, clamps, or set-screws, which engage the shaft at particular spaced points thereon, so that the entire segment of shaft between each pair of such points represents a twistable nexus of substantial length (axially) and of limited cross-section. For the same opposed moments, the smaller the cross-section, or the greater the segmental distance between the points of application of the opposed moments, the greater will be the torsional distortion.

The present invention deals with this problem by treating the shaft as a tension member running down through the flywheel, in which the tachometer disc is mounted and motor rotor and pulling them together as a stack of compression members. It will be seen that the shaft 31 has a downwardly facing shoulder 32 against which the inner race 33 of the lower bearing is set; against race 33 is set an upper extension portion of the flywheel 34; against flywheel 34 is set the motor rotor hub 36 ( with intervening shims 37); and the whole is secured by means of a nut 38 threaded on the lower end of shaft 31 and bearing against the hub 36 through a washer 39. Thus, the assembly is locked together as a unitary structure with appreciably expanded effective diameter and cross-section, while at the same time the dimensions between the points of application of the opposed torsional moments are substantially reduced. Furthermore, the somewhat increased axial density of the members under compression assists them in resisting torsional stress, and the axially directed compression forces also increase the internal frictional resistance to torsional shearing forces orthogonal to the axis; and since the compressed elements are engaged at substantially greater diameters than the shaft diameter, the net effect is a torsionally strengthening one.

Other details of the rotating assembly mounting are as follows: the inner races of the upper and lower bearings are cemented to the shaft 31, and the upper inner race 41 is also positioned against a shoulder 42 of the shaft; the outer race 43 is positioned against a retaining ring 44 set in an appropriate circumferential groove on the interior of the main housing element 46, which is a heavy casting. The outer race 47 of the lower bearing is preloaded through a ring member 48 by means of three angularly equispaced compression springs 49 which rest upon a plate 51 that is secured to the housing 46 by means of bolts 52. A pair of diametrically opposed balancing set-screws 53 are threaded into appropriate bores 54 in the flywheel 34, and the flywheel is indexed against rotational displacement from its desired perpetually-indexed position on the shaft by means of a conical-pointed set-screw 56, which is employed as an indexing means rather than as a retaining means. A diametrically opposite bore 57 is provided, of just the right diameter and depth to balance the bore needed for set-screw 56. The delicate glass photo-engraved tachometer disc 58 is retained on the flywheel as by means of a springy spider 59, retained by a retaining ring 61 seated in an appropriate groove in the shaft 31; thus the tachometer disc itself is not subjected to the compressive stresses imposed by the nut 38 on the shaft. It may be epoxy-cemented to the flywheel for permanent indexing. The motor hub 36 carries a printed circuit rotor 62, while the magnet ring 63 is carried by a lower motor housing piece 64 which is coupled to the upper motor housing piece 66 and the whole to the main housing as by means of three angularly equispaced bolts 67, which have the form of extended legs defining a tripod stand for the entire capstan-tachometer assembly whenever it needs to be removed from the transport. The shims 37, mentioned previously, are used to obtain just the right clearance between motor rotor 62 and magnet ring 63.

THE VACUUM CAPSTAN

Ordinarily in the art, a vacuum capstan is arranged to have a perforated rotating shell enclosing a cylindrical manifold block from which the air is pumped through interior passages. A sector of the block is cut away to define the sector of the capstan in which the suction is to be applied. The remainder of the cylindrical periphery of the block must be spaced as closely as possible to the cylindrical interior surface of the rotating outer shell so as to prevent leakage of air through the intervening space and through the perforations and this space, in such a way as to spoil or decrease the relative degree of vacuum applied to the tape in the desired sector. Nevertheless, a non-rubbing clearance must be maintained between the manifold block and shell. To obtain the best result calls for absolute roundness of both block and shell, and absolute concentricity of both elements, which conditions are extremely difficult and expensive to attain during the manufacturing process; and they are both subject to easy destruction through banging and jarring during field operation. When damaged, the parts cannot be repaired, but must be replaced as an entire assembly of matched parts, which is also quite expensive.

Accordingly, the present invention contemplates an arrangement in which the division between the rotating element and the manifold element is made in a plane orthogonal to the rotational axis, so that a narrow clearance is easier to maintain with less expensive and more easily adjustable and replaceable parts.

As shown in FIG. 3, the rotating capstan block 71 is formed with a number of circumferential shallow grooves 72, which are vented by a number of radially directed bores 73 arranged in staggered helical rows, so that along the generatrix occupied by each bore 73, there are always aligned at least one or two other bores 73. Along, between and parallel to each discrete pair of such generatrically aligned bores 73, there is provided a supply bore 74 communicating with the the most proximal sets of bores 73. Thus, as shown on the left-hand side of the Figure, each bore 74 communicates with one set of three (or two) bores 73 positioned anti-clockwise (in plan) from the bore 74), and also with another set positioned clockwise from the bore 74 (which set is not shown with respect to the one illustrated bore 74 because it lies clockwise from the plane upon which the Figure is broken-away in section). The bottom surface of the block 71 is carefully machined to be truly flat and normal to the rotational axis. Directly below this surface there is mounted a fixed plate 76 having a confronting upwardly-facing planar flat face that is spaced from the block 71 for a dimension of 0.0030–0.0020 inches. This plate is secured by screws (not shown) to a manifold ring 77, and the plate 76 has a crescent-shaped (about 90 degrees arcuate extent) opening 78 formed therein to define the sector of operation in which vacuum is to be applied to the tape; this opening 78 is at the same radius as the circle of bores 74 of the capstan, and it communicates with a supply bore 79 in the ring 77 and to a nipple 81 to which a vacuum supply hose may be attached in the usual way. A dust cover 82, in the form of a two half-circle ring elements, is secured by a flexible tie element 83 to seal the gap between the rotating block 71 and plate 76.

The axial spacing and parallelism of the opposed faces of the rotating block 71 and plate 76 may be adjusted and set by means of the mounting of ring 77, which is in the form of three triangularly or circumferentially entially spaced bolts 86, which pass through smooth-bored openings in cut-away flanged portions of the ring 77, and are threaded into three respective threaded spacers 87, which in turn are used as nuts to three spring-loaded bolts 86 that secure the main housing 46 to a mounting plate 89 by which the entire assembly may be secured to the chassis mounting plate 91 of the transport. A capstan cap member 92 is secured by a bolt 93 threaded into the upper end of the shaft 31, upon which the capstan block 71 is press-fitted or shrink-fitted. Also, it will be noted that a certain small clearance is provided between the ring 77 and the periphery of the housing 46 so that venting of the bearing area through an opening 96 effected, to forestall the pulling of grease from the bearing area into the capstan vacuum system Openings 94 and groove 97 are used to inject adhesive to lock the outer race 43 of the bearing.

THE TACHOMETER

The tachometer is of a previously known type in which the rotating glass disc has a number of circumferentially equi-spaced photographically etched radial indicia lines (not shown), which during rotation are repeatedly matched and mis-matched with similarly etched and spaced indicia lines 130 on a glass grating (fixed), and read by means of a light source which sends a beam of light through the disc and grating to a photoelectric transducing element. The lines on the disc define a circular array with a predetermined center and radius, and the lines 130 on the grating define an arcuate array of the same radius but with the center eccentrically offset along a plane 116 that includes the axis of shaft 31. In an actual embodiment of the invention there are 1933 lines, the number being selected as a prime number so that the photographer cannot divide the array into quadrants so as to decrease the cost of reproduction at the expense of accuracy and resolution. Because the spacing for 1933 lines at the illustrated radius is so small, the lines cannot be perceived by the eye alone; so for purposes of illustration only, the spacing between the lines has been greatly increased. By establishing a controlled amount of eccentricity between the circle of radial lines on the disc and the arc of radial lines 130 on the grating it is possible to ascertain not only the fundamental speed changes, but also the degree of change and the direction of change, i.e., whether the change is increasing or decreasing in value. The present apparatus, however, has certain novel features, described below.

As most clearly seen in FIG. 2, the housing 46 has a flat tangential side portion defining a window 101 for the insertion and positional adjustment of a supporting framework for the grating 102, the light sources 103 and 104, which are light-emitting diode (LED) elements, and a corresponding pair of photodiode elements 106, 107. The supporting framework extends from a mounting plate 111 that is cut to the same shape as the window 101 and covers it. The vertical position and tilt of the plate 111 is adjusted by means of eccentric pins 112 and 113, and the horizontal position by means of eccentric pin 114, to bring the grating 102 parallel to and correctly spaced from the rotating tachometer disc 58, and the radii of the disc and grating that are normal to the plane of the cover plate 111 into strict alignment in a radial plane containing the axis of shaft 31, all as shown in FIGS. 4 and 5. The radial plane is the plane 116 in these figures. The position of the plate 111 is then secured by means of (large-headed) bolts passing loosely through holes 117 in the plate and threaded into the window framework of the housing 46. On the inside of the plate 111 are mounted a circuit board 118 and bracket 119, from which extends a circuit board 121 mounting the photodiodes 106, 107; and from the bracket 119 also integrally extends a pair of spring arms 122 and linking beam 123 defining a flexible parallel-motion linkage element for adjusting the radial position, along radial plane 116, of the center of the grating 102 with respect to that of the tachometer disc 58. The grating is attached to the moving beam portion 123 of the bracket by means of a spot of epoxy cement, and a set screw 126 (FIG. 5) is used to accurately position the grating in motion parallel to the plane 116. To protect the heads of the adjusting elements 112, 113, 114 and 126 from subsequent disturbance, a cover plate 115 (FIG. 3) is secured to the housing 87 by means of bolts pasing through outsized holes 120 in plate 111. Item 125 is an electrical connector.

As is most clearly to be seen from FIG. 5, the vertical co-incidence (conjunction) of the grating indicia lines 130 and the tachometer disc lines (not shown) does not vary at point 131, which is the position of LED 104 and photodiode 107, but the coincidence of the grating and disc lines is true and correct at position 132 (the position of LED 103 and photodiode 106), only when the radial lines of the grating and disc are strictly concentric. In such a true concentric position, the signals from the two photodiodes would be in precise phase, but as the grating 102 is moved radially in and out parallel to plane 116 by means of set screw 126, the photodiode signals move correspondingly out of phase, and when the adjustment is just correctly out-of-phase, then the second-order characteristics of speed difference, magnitude and direction-of-change of magnitude can also be determined. The present invention departs from the prior art at least in maintaining the lines at point 131 always in coincidence and only the lines at point 132 non-co-incident (disjunctive), rather than as in the prior art, in which both sets of lines are non-coincident (disjunctive) on either side, and at equal angles from, the normal plane 116.

THE REEL MOUNTING

As a further feature of the present apparatus, the mounting plates 141 for the reels and reel motors (FIG. 6) are arranged to accomodate either 14-inch reels in the outboard positions shown (and also shown in FIG. 1), or, when it is desired to rack-mount the transport without having the reels overhang the transport sides, then reels of 9.75 inch diameter may be used, as by removing each of the plates 141, rotating them 180 degrees in the plane of the transport top plate and remounting the plates with motors still attached. It will be noted that the mounting position for the reel motor in each of the plates 141, as shown in FIG. 6, is offset from the plate center along a diagonal line and in a direction away from, e.g., the guide 16. Thus, when the plates are rotated 180 degrees, the spindle openings 142 are brought correspondingly closer to guide 16 and away from the transport corners and sides. The same conformation for the plates 142 makes them interchangeable from left to right, so that only one type of casting mold need be made for all of the plates.

It will be understood that the plates 141 could be circular, or of any symmetric or non-symmetric shape, but are here shown as substantially square, and each fits upon a correspondingly squarely patterned positioning zone on the transport in either of at least two diametrically opposed orientations with respect to a predetermined diagonal 145 of the positioning zone, with the axis 146 of the reel on diagonal 145 but offset from the midpoint 147 thereof.

What is claimed:
1. A capstan construction comprising:
    a circular-cylindrical capstan element mounted for axial rotation and having air passages communicating with the cylindrical face thereof;
    a housing and manifold portion thereof having air passages communicating with the passages of said capstan in an axial direction of the capstan for the passage of air therebetween;
    said manifold portion of said housing being formed as an element separate from the remainder of said housing and mounted thereon as by means of at least three circumferentially spaced mounting screws adapted for adjusting the tilt and spacing of said manifold and block.
2. A capstan construction comprising:

a right circular cylindrical capstan block, a shaft mounting said block for axial rotation therewith, and a housing mounting said block and shaft for conjoint co-axial rotation therein;

said capstan block having a planar inboard face orthogonal to the axis thereof, and said housing having a manifold portion presenting a flat face parallel to, confronting and closely spaced from the flat face of the capstan block;

said manifold portion of said housing being formed as an element separate from the remainder of said housing and mounted thereon as by means of at least three circumferentially spaced mounting screws adapted for adjusting the tilt and spacing of said manifold and block; and said block and manifold having interior passages communicating with one another and with the cylindrical face of said block for the passage of air therebetween.

3. A capstan construction comprising:

a right-circular cylindrical capstan block, a shaft mounting said block and a housing mounting said shaft for conjoint co-axial rotation with respect to said block;

said block having a plurality of shallow circumferential grooves formed therein and a corresponding plurality or radial passages formed therein communicating with said grooves, together with a corresponding plurality of axially directed bores each communicating with a different set of said radial passages and opening on an inboard flat face of said block orthogonal to the axis thereof; and said housing having a manifold portion defining a flat face parallel to and closely confronting said inboard flat face of said capstan block and a sector-shaped opening confronting and communicating with a limited correspondingly sector-shaped set of said bores opening on said inboard flat face of said capstan block for the passage of air therebetween without appreciable leakage of air radially between said flat faces; and said manifold portion of said housing being formed as an element separate from the remainder of said housing and mounted thereon as by means of at least three circumferentially spaced mounting screws adapted for adjusting the tilt and spacing of said manifold and block.

4. A magnetic tape transport of the class including motor-driven supply and takeup reels for said tape, guide means for bending said tape into a predetermined path, tension regulating means engaging said tape and coupled to control said reels to maintain a predetermined tension is said tape, and tape driving capstan and tachometer means for moving said tape at a predetermined speed, characterized in that:

said capstan has interior passages communicating with the cylindrical tape-engaging face thereof for the application of vacuum differential pressure to said tape to increase the frictional driving contact between tape and capstan, and means are provided for applying said differential pressure to said capstan at a face thereof orthogonal to the capstan axis;

said tachometer comprises a disc attached to a flywheel mounted on said capstan and bearing a circular array of indices centered on the axis of said capstan, and disc speed reading means including an arcuate array of indices centered on a center that is eccentric of said circular array, together with first means observing the indices of both of said arrays in an axial plane containing the centers of both said arrays, and second means arcuately spaced from said first means for observing both of said arrays;

a motor driving said capstan, with the rotor of said motor engaging said flywheel, a set of shims, and means for clamping said rotor and said flywheel tightly together in an axial direction with said shims therebetween for increasing the torsional rigidity of the rotor-flywheel assembly; and a mounting element for each of said reels and for the reel-driving motor thereof, each of said mounting elements being mountable on said transport in a plurality of orientations about a center thereof to which the axis of the corresponding reel is eccentric, so as to accommodate reels of different diameters within a minimal spatial envelope.

5. A tachometer structure for a driven shaft mounted for rotation in a housing, comprising:

a tachometer disc means concentrically mounted on said shaft and a non-rotating reading means mounted on said housing, each of said means having a set of indices arcuately arranged at equal radii, the disc indicia set being concentric with said shaft axis, but the reading means indicia set being eccentrically mounted with respect to the axis of said shaft;

said reading means, in an operating position thereof, being adapted to read the conjunctions of said sets of indices at circumferentially spaced points of one of said sets, one of said points being the point at which the centers of arc of said sets of indices are located in the same axial plane of said shaft, with said plane containing said one point; and orthogonal adjusting means mounted on said housing for moving said non-rotating indicia toward and away from said operating position thereof, and particularly in two directions orthogonal to said shaft axis, one of said directions being parallel to said common axial plane, and the other of said directions being normal to said common axial plane.

6. A tachometer structure for a driven shaft mounted for rotation in a housing, comprising:

a tachometer disc mounted on said shaft and bearing a circular array of equispaced index marks said array being concentric with the axis of said shaft;

a non-rotating grating mounted on said housing and bearing an arcuate array of similarly spaced index marks at the same radius as that of said circular array but said arcuate array being eccentric to said circular array in a direction normal to the shaft axis in a predetermined axial plane of said shaft;

means arranged, in an operating position thereof, to read the conjunctions of said marks both at said axial plane and at one other point angularly spaced from said axial plane; and orthogonal adjusting means for moving said non-rotating grating, and the arcuate array of index marks thereon, toward and away from an operating position thereof, and particularly in two directions orthogonal to the axis of said shaft, one of said directions being parallel to said predetermined axial plane of said shaft, and the other of said directions being normal to said predetermined axial plane.

7. A tachometer structure for a driven shaft as recited in claim 6, wherein the number of marks in said circular array is a prime number;
    whereby each quadrant set of said marks in said circular array is different from the others.

8. A tachometer structure for a driven shaft as recited in claim 6, wherein:
    said reading means includes a pair of light-emitting photodiodes mounted in said housing and arcuately spaced along said arcuate array of index marks on the side of said arcuate array opposite to said circular array; and
    a pair of photodiodes mounted in said housing in axially spaced relation from said light-emitting diodes and on the opposite side of said circular and arcuate arrays of index marks from said light-emitting diodes;
    said disc and grating being generally transparent to said light and said marks being opaque thereto.

* * * * *